(12) United States Patent
Akaogi et al.

(10) Patent No.: US 6,760,114 B2
(45) Date of Patent: Jul. 6, 2004

(54) SUPPORT APPARATUS FOR OPTICAL WAVE INTERFEROMETER REFERENCE PLATE

(75) Inventors: Toshikazu Akaogi, Saitama (JP); Hiroshi Shibamoto, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 231 days.

(21) Appl. No.: 10/156,027

(22) Filed: May 29, 2002

(65) Prior Publication Data

US 2002/0180984 A1 Dec. 5, 2002

(30) Foreign Application Priority Data

Jun. 4, 2001 (JP) ........................................ 2001-168242

(51) Int. Cl.[7] .......................... G01B 9/02; G01B 7/182; G02B 7/182
(52) U.S. Cl. ........................................ 356/512; 359/871
(58) Field of Search ................................ 356/512, 244; 359/811, 871

(56) References Cited

U.S. PATENT DOCUMENTS 6,556,304 B1 * 4/2003 Shibamoto .................. 356/450

FOREIGN PATENT DOCUMENTS

JP 2000-249512 11/2000

* cited by examiner

*Primary Examiner*—Samuel A. Turner
*Assistant Examiner*—Patrick Connolly
(74) *Attorney, Agent, or Firm*—Snider & Associates; Ronald R. Snider

(57) ABSTRACT

A support apparatus for an optical wave interferometer reference plate comprises a support member for supporting an outer peripheral face of the reference plate. The support member is bonded to the outer peripheral face of the reference plate at a plurality of positions spaced from each other along the circumferential direction of the outer peripheral face and adapted to deform elastically in a circumferential/diametric direction of the reference plate but less in the optical axis direction of the reference plate than in the circumferential/diametric direction.

5 Claims, 3 Drawing Sheets

SUPPORT APPARATUS FOR OPTICAL WAVE INTERFEROMETER REFERENCE PLATE

RELATED APPLICATIONS

This application claims the priority of Japanese Patent Application No. 2001-168242 filed on Jun. 4, 2001, which is incorporated herein by reference.

BACKGROUND OF THE INVENTION

1. Field of the Invention

The present invention relates to a support apparatus for an optical wave interferometer reference plate, which is used for allowing an optical wave interferometer body to support a reference plate employed in an optical wave interferometer capable of measuring the surface form or internal distortion of optical components and the like with a high accuracy.

2. Description of the Prior Art

Various optical wave interferometers have been in use in order to measure very fine surface forms of samples and the like accurately, and so forth. In optical wave interferometers carrying out such highly accurate measurement, the reference plate is required to be prepared with a high precision as well.

Therefore, though depending on the accuracy required in measurement, the reference surface of a reference plate has been finished grinding with such a high precision that its amount of deviation from a perfect plane is 1/20 of the optical wavelength in use or so in general. Though the rear side of the reference surface is not required to have accuracy as high as that of the reference surface, it has also been finished grinding with a precision of about 1/5 to 1/10 of the optical wavelength in use.

The outer peripheral face of the reference plate has been ground or lapped with a roughness of about #400 to #800 in general. Also, the reference plate has been formed from a material having a low coefficient of thermal expansion, such as silica or ceramics in general. Therefore, in optical systems in which luminous fluxes are transmitted through a reference plate in particular, evenness is required in the refractive index distribution within the material.

It is important that a reference plate finished with a high precision as such be attached to an interferometer body and used while keeping its precision. Therefore, various methods for supporting a reference plate have been proposed and used conventionally.

Some of typical methods have been disclosed in commonly assigned Japanese Unexamined Patent Publication No. 2000-249512.

For example, there is a method in which a reference plate is supported from its optical axis direction end face (reference surface) side. This method is one in which a lens barrel for supporting a reference plate is formed with an annular abutment surface for supporting the reference surface of the reference plate, so that the reference plate is supported with the abutment surface from the reference surface side. However, since the machined abutment surface has a surface precision inferior to the reference surface finished grinding with a high precision in this method, the contact between the abutment surface and the reference surface may become uneven, so that the reference plate may flex unevenly, whereby the surface precision of reference surface may deteriorate.

Hence, a method in which a cushioning material is held between the reference surface and the annular abutment surface has been proposed in order to alleviate the uneven contact. However, though the uneven contact is alleviated by this method, the cushioning material may lose its elasticity with time due to the continuous pressure effected by the weight of the reference plate itself, so that the cushioning effect may be lost, whereby uneven contact may occur again.

Therefore, a method in which the reference plate is supported from its diametric end face (outer peripheral face) side has been proposed. This method bonds the outer peripheral face of the reference plate to the inner face of the lens barrel such that the reference plate is suspended with respect to the lens barrel, whereas an adhesive is mainly used for bonding. Since nothing comes into contact with the reference surface of the reference plate in this method, the problem of surface precision deterioration resulting from the contact between the reference surface and the abutment surface or cushioning material as in the method supporting the reference surface of the reference plate does not occur.

However, even in this supporting method, the material forming the lens barrel and the material forming the reference plate may have coefficients of thermal expansion different from each other, so that a force may act on the reference plate by way of the bonded part of the outer peripheral face of the reference plate when temperature changes, thereby deforming the reference surface having a high precision.

Also, using an adhesive for bonding may be problematic when curing the adhesive. Namely, if the thickness of an adhesive layer varies, a force may act on the reference plate due to volumetric changes upon curing, thereby altering the reference surface having a high precision.

Therefore, a method in which the reference plate is elastically supported from its diametric end face (outer peripheral face) side has been devised. In this method, an elastic member is disposed at the outer peripheral face of the reference plate, and the lens barrel and the outer peripheral face of the reference plate are secured to each other by way of the elastic member such that the reference plate is suspended with respect to the lens barrel. Since nothing comes into contact with the reference surface of the reference plate in this method, the problem of surface precision deterioration resulting from the contact between the reference surface and the abutment surface or cushioning material as in the method supporting the reference surface of the reference plate does not occur. Also, since the reference plate and the lens barrel are not in contact with each other directly but by way of the elastic member, no force acts on the reference plate by way of the bonded part of the outer peripheral face of the reference plate when temperature changes, and no force acts on the reference plate due to volumetric changes upon curing the adhesive, whereby the reference surface having a high precision does not deform.

However, since the elastic member is disposed at the outer peripheral face of the reference plate, whereby the lens barrel and the outer peripheral face of the reference plate are secured to each other by way of the elastic member such that the reference plate is suspended with respect to the lens barrel, the above-mentioned supporting method may also be problematic in that the reference surface position varies along with temporal changes in elastic force of the elastic member.

Also, when the reference plate is measured while repeatedly moving/stopping it in its optical axis direction at a high speed in order to obtain highly accurate numeric data by interference measurement, as in the case using fringe scanning, which is a highly accurate interference fringe analyzing technique, minute vibrations corresponding to the spring constant of the elastic member for holding the reference plate with respect to the lens barrel in a suspended state may occur at the time when the reference plate starts and stops moving, thus making it difficult to carry out highly accurate measurement.

Further, when the lens barrel having the reference plate suspended by way of the elastic member is attached to the interferometer body, the reference plate and the interferometer body are elastically secured to each other. Since the characteristic frequency of the interferometer body and that of the reference plate differ from each other, the reference surface and the surface of a sample to be inspected may not stand still relative to each other depending on the vibrating environment in which an interferometer apparatus having the reference plate attached thereto is placed.

SUMMARY OF THE INVENTION

In view of the circumstances mentioned above, it is an object of the present invention to provide a support apparatus for an optical wave interferometer reference plate which, when supporting the outer peripheral face of the reference plate, can prevent forces generating deformations influential in the accuracy in measurement from acting on the reference plate due to the difference in coefficient of thermal expansion between the support apparatus and reference plate when temperature changes and prevent the reference surface from moving or vibrating relative to the surface of a sample to be inspected.

In particular, it is an object of the present invention to provide a support apparatus for an optical wave interferometer reference plate which, when bonding the reference plate to the support apparatus in a suspended state, can prevent forces generating deformations influential in the accuracy in measurement from acting on the reference plate due to the difference in coefficient of thermal expansion between the support apparatus and reference plate when temperature changes, restrain forces from acting on the reference plate due to volumetric changes upon curing an adhesive, and prevent the reference surface from moving or vibrating relative to the surface of a sample to be inspected.

For achieving the above-mentioned objects, the support apparatus for an optical wave interferometer reference plate in accordance with the present invention is configured such that the reference plate is attached to a lens barrel or an interferometer body by way of a support member bonded to the outer peripheral face of the reference plate, the support member can be constructed by a single component, and the difference in deformation between the support member and reference plate occurring due to the difference in their coefficients of thermal expansion at the time when temperature changes can be cancelled by diametric/circumferential elastic deformations of the support member.

Namely, in an optical wave interferometer for splitting a luminous flux from a light source into two, irradiating a sample with one of thus obtained two luminous fluxes so as to attain object light carrying a phase state of the sample, irradiating a reference plate with the other so as to attain reference light carrying a phase state of the reference plate, and re-combining the object light and reference light together so as to attain an interference fringe corresponding to a phase difference therebetween, the support apparatus for an optical wave interferometer reference plate in accordance with the present invention comprises a support member for supporting an outer peripheral face of the reference plate, the support member being a structure bonded to the outer peripheral face of the reference plate at a plurality of positions spaced from each other along the circumferential direction of the outer peripheral face and adapted to deform elastically in a circumferential/diametric direction of the reference plate but less in an optical axis direction of the reference plate than in the circumferential/diametric direction.

The support member may have an annular form surrounding the outer peripheral face of the reference plate, while comprising cutouts extending from one of first and second ends in the optical axis direction of the reference plate toward the other end to a position near the other end, in which cutouts extending from the first end toward the second end and cutouts extending from the second end toward the first end substantially alternate with each other along the circumferential direction of the support member.

The support member may be formed with adhesive injection holes penetrating through the support member from the outer peripheral face to inner peripheral face thereof with a predetermined interval along the circumferential direction of the support member, whereas a groove extending in the circumferential direction may be formed at positions where the adhesive injection holes are formed.

The support member may have an annular base disposed at a position separated from the outer peripheral face of the reference plate in the optical axis direction of the reference plate, a plurality of support arms extending from the base in the optical axis direction of the reference plate in a cantilever fashion at a plurality of positions spaced from each other by a predetermined interval along the circumferential direction of the base, and a bonding part formed in each of the support arms so as to be bonded to the outer peripheral face.

The bonding part may be constituted by an adhesive injection hole penetrating through the support arms from the outer side face to inner side face thereof, whereas a groove extending in the circumferential direction of the base may be formed at a position where the adhesive injection hole is formed in the inner side face.

DESCRIPTION OF THE PREFERRED EMBODIMENTS

In the following, support apparatus for an optical wave interferometer reference plate in accordance with embodiments of the present invention will be explained with reference to the drawings.

EXAMPLE 1

Figure 1A:
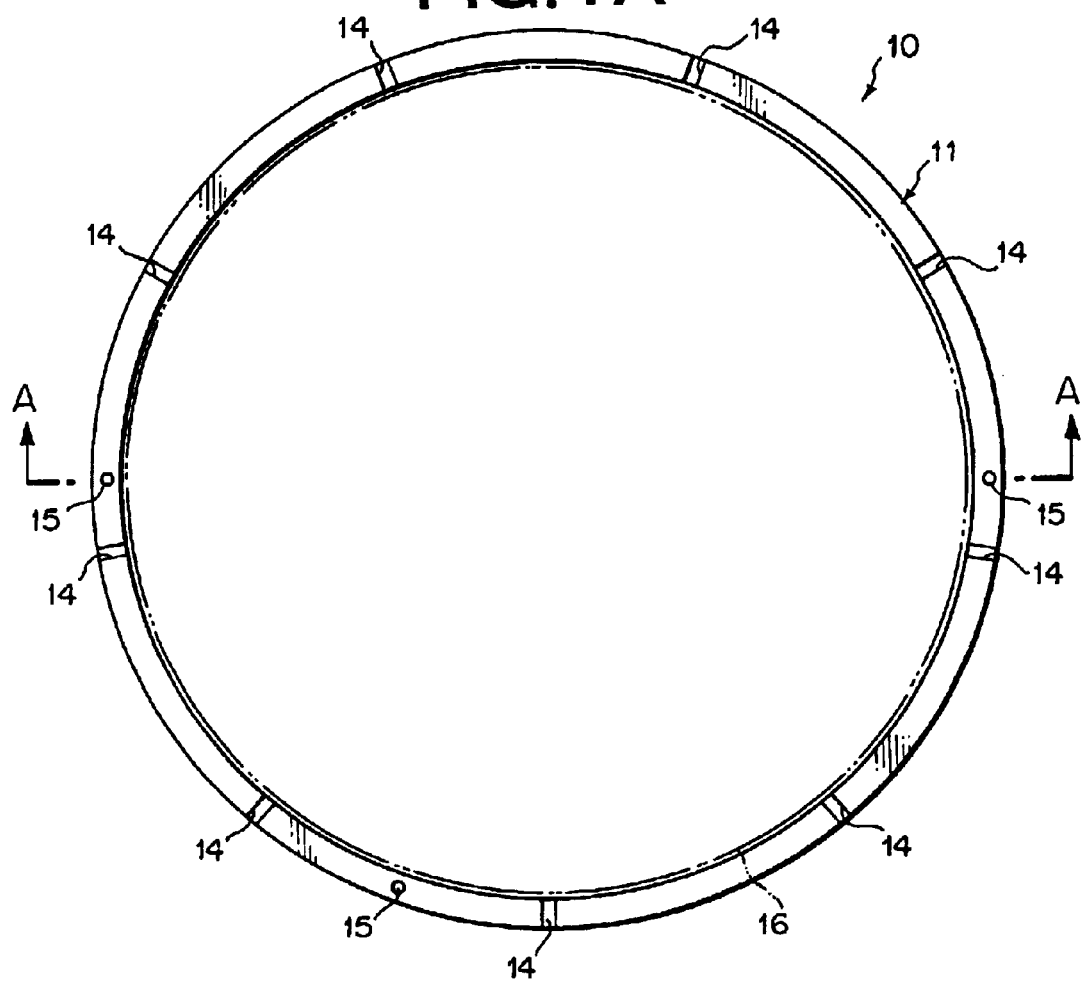
FIGS. 1A and 1B are views showing an example of the support apparatus in accordance with the present invention.
Figure 1B:
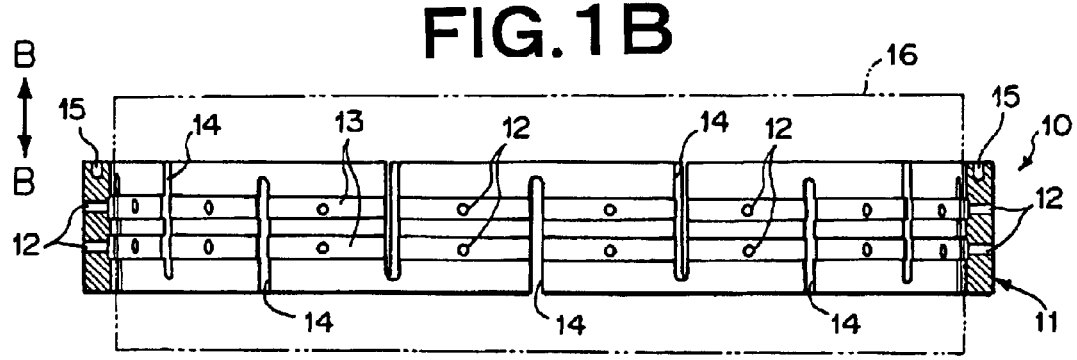

FIGS. 1A and 1B are views showing an example of the support apparatus in accordance with the present invention. Namely, FIG. 1A is a top plan view, whereas FIG. 1B is a sectional view taken along the line A—A shown in FIG. 1A. As shown in FIGS. 1A and 1B, the support apparatus 10 is attached to an optical wave interferometer lens barrel shown in FIGS. 2A and 2B, and comprises a support member 11 having an annular form integrally formed like a band from a metal material (e.g., aluminum). The circumferential face part of the support member 11 is formed with a plurality of adhesive injection holes 12, aligning two by two in the vertical direction (in the direction of B—B shown in FIG. 1B), at predetermined intervals along the circumferential direction. Each adhesive injection hole 12 penetrates through the support member 11 from the outer peripheral face to the inner peripheral face. The inner peripheral face of the support member 11 is formed with two rows of grooves, vertically aligning with each other, each intermittently extending along the inner peripheral face while connecting the respective positions at which the adhesive injection holes 12 adjacent to each other are formed.

Also, the support member 11 is formed with a plurality of cutouts 14 extending from one vertical end to the other end. The cutouts 14 are formed along the peripheral direction of the support member 11 between respective positions where the adhesive injection holes 12 are formed. Here, adjacent cutouts 14 extending opposite from each other, i.e., those extending from the upper end and those extending from the lower end alternate with each other. Each cutout 14 is formed so as to extend from one of two ends of the support member 11, such that its leading end exceeds the positions where the two rows of grooves 13 are formed and approaches a position near the other end. Since such a cutout 14 is formed, the free end of each cutout 14 elastically opens/closes when a stress acts on the inner peripheral face of the support member 11 in its diametric direction, thereby freeing the stress.

The upper face of the support member 11 is formed with a plurality of (e.g., 3) pin receiving holes 15 having a predetermined interval in the circumferential direction, which are employed for positioning when attaching the support apparatus 10 to the optical wave interferometer lens barrel.

In thus configured support apparatus 10, the support member 11 is arranged so as to surround the outer peripheral face of the reference plate 16 with a gap therebetween, and is bonded and secured to the outer peripheral face of the reference plate 16 with an adhesive injected from the adhesive injection holes 12. Here, the positional relationship between the support apparatus 10 and reference plate 16 is adjusted such that the center position of the reference plate 16 in the thickness direction (optical axis direction) and the vertical center position of the support apparatus 10 substantially coincide with each other, i.e., the position of a neutral plane of the reference plate 16 in the thickness direction thereof is located between the upper and lower grooves 13. The grooves 13 prevent the adhesive injected from the adhesive injection holes 12 from dripping. The support apparatus 10 and the reference plate 16 are bonded to each other only in the part of adhesive injection holes 12, whereas the inner peripheral face of the support member 11 of the support apparatus 10 and the outer peripheral face of the reference plate 16 are kept in a noncontact state except for the part of adhesive injection holes 12.

Figure 2A:
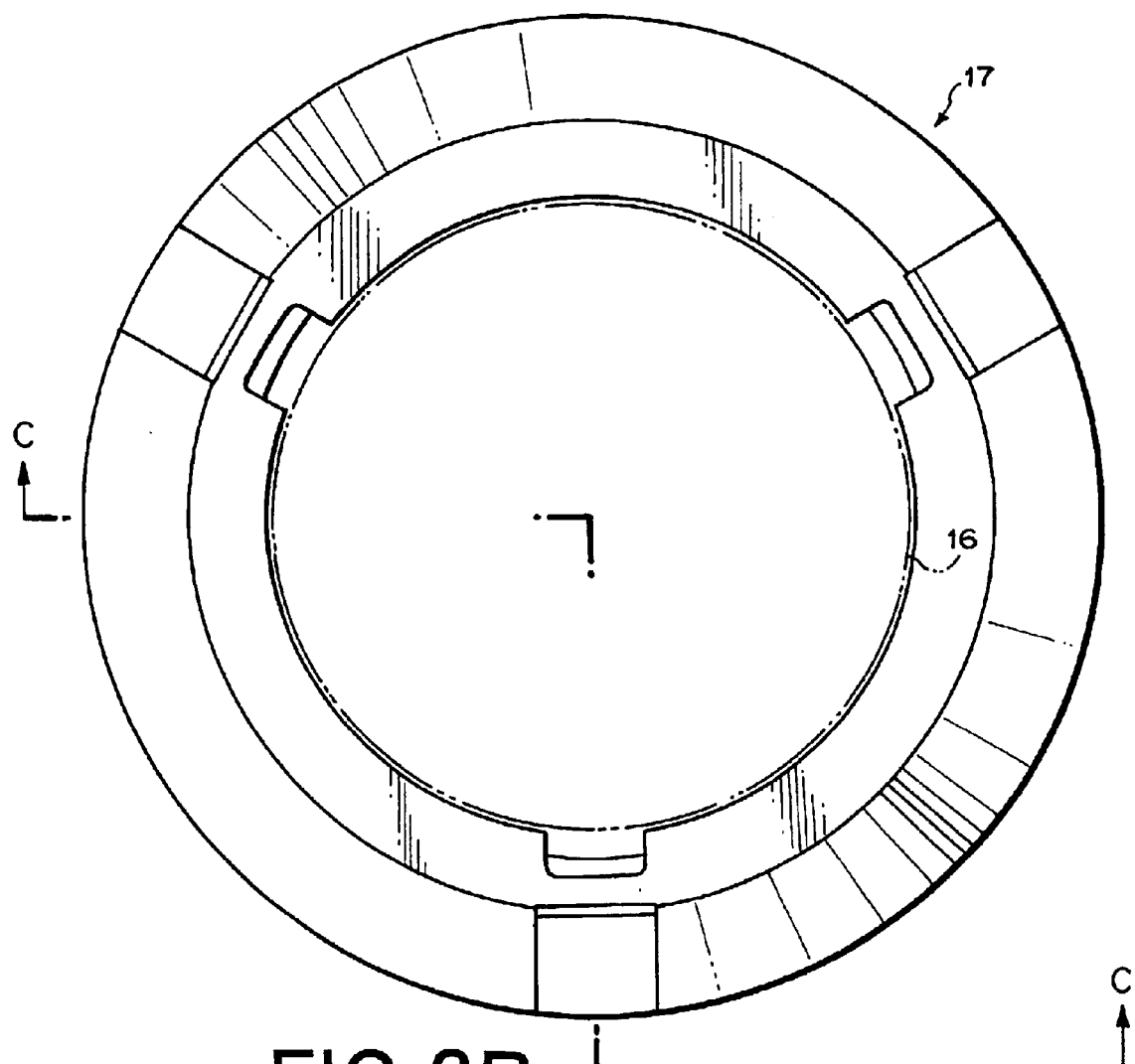
FIGS. 2A and 2B are views showing a state where the support apparatus shown in FIGS. 1A and 1B are attached to an optical wave interferometer lens barrel.
Figure 2B:
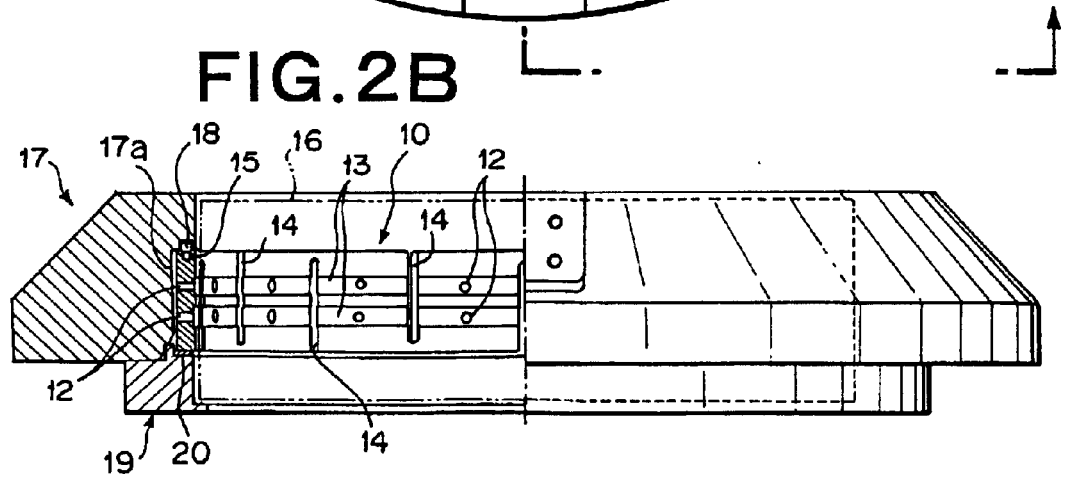

The reference plate 16 bonded to the support apparatus 10 with the adhesive is attached to the optical wave interferometer lens barrel by way of the support apparatus 10. FIGS. 2A and 2B show this state. FIGS. 2A and 2B are views showing the state where the reference plate 16 is attached to the lens barrel. FIG. 2A is a top plan view, whereas FIG. 2B is a sectional view taken along the line C—C shown in FIG. 2A.

As shown in FIGS. 2A and 2B, the reference plate 16 bonded to the support apparatus 10 and held thereby is attached to the inside of an annular lens barrel 17 by way of the support apparatus 10. The inner peripheral face of the lens barrel 17 has a temporary receiving face 17a formed like a step along the peripheral direction, whereby the reference plate 16 is mounted to the inside of the lens barrel 17 with a gap therebetween such that the upper face part of the support apparatus 10 is temporarily supported by the temporary receiving surface 17a in a state where the lens barrel 17 is vertically inverted from the state shown in FIG. 2B. Here, a plurality of positioning pins 18 rising from the temporary receiving surface 17a are inserted into their corresponding pin receiving holes 15 formed in the upper face of the support apparatus 10, whereby the support apparatus 10 and the lens barrel 17 are positioned with respect to each other.

After once temporarily supported by the temporary receiving surface 17a, the support apparatus 10 is secured to the lens barrel 17 as the lower face of the support member 11 is brought into contact with and supported by a press ring 19 attached to the lens barrel 17 from the lower side thereof, so as to be secured to the lens barrel 17. A cushioning member 20 formed from cork, foamed styrol, or the like, for example, is interposed between the press ring 19 and the lower face of the support member 11 of the support apparatus 10. The reference plate 16 and the lens barrel 17 are kept in a noncontact state except for indirect contact in the part of adhesive injection holes 12. Further, the outer peripheral face of the support member 11 of the support apparatus 10 and the inner peripheral face of the lens barrel 17 are kept in a noncontact state. The lens barrel 17 supporting the reference plate 16 by way of the support apparatus 10 as such is held by an optical wave interferometer body which is not depicted.

Since the reference plate 16 is attached to the lens barrel 17 in a noncontact state in the diametrical direction thereof except for the indirect contact in the part of adhesive injection holes 12, forces generating deformations influential in the accuracy in measurement can be prevented from acting on the reference plate 16 due to the difference in coefficient of thermal expansion between the lens barrel 17 and the reference plate 16 when temperature changes. Also, since the support apparatus 10 supporting the reference plate 16 is easy to deform elastically in the part of cutouts 14 formed in the support member 11, even when the support member 11 expands/contracts due to changes in temperature, the part formed with cutouts 14 deforms elastically, whereby large forces can be prevented from being transmitted to the bonded part between the support member 11 and the outer peripheral face of the reference plate 16. Therefore, the reference plate 16 can be prevented from deforming due to external forces acting on the reference plate 16 when temperature changes, and forces are restrained from acting on the reference plate 16 due to volumetric changes upon curing the adhesive.

The cutouts 14 formed in the support apparatus 10 extend in the optical axis direction of the reference plate 16 and have a structure allowing elastic deformations in the direction orthogonal thereto, while being harder to deform elastically in its extending direction, i.e., in its optical axis direction, than in the orthogonal direction. Therefore, even when carrying out fringe scanning analysis in which measurement is repeated while moving the reference plate 16 in the optical axis direction at a high speed, the support apparatus 10 is rigid in its moving direction, whereby no adverse effect occurs from the cutouts 14.

Since the support apparatus 10 is constituted by one component, it is easy to process, and can easily be attached to the reference plate 16.

As a specific form of the reference plate 16, one having a disk-shaped form with a diameter of 320 mm and a thickness of 100 mm may be used, for example.

EXAMPLE 2

Figure 3:
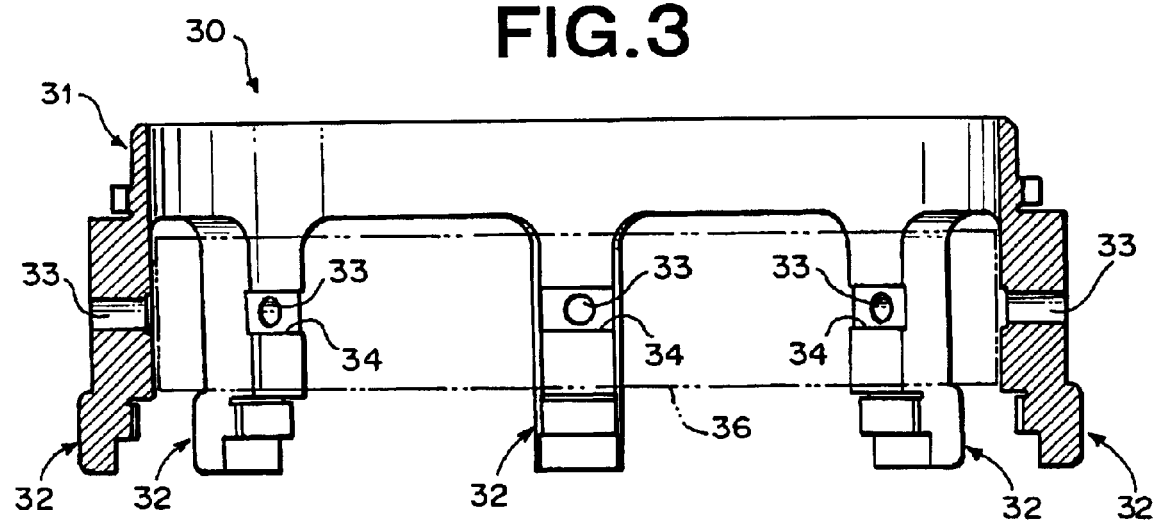
FIG. 3 is a view showing another example of the support apparatus in accordance with the present invention.

FIG. 3 is a sectional view showing an example of the support apparatus in accordance with another embodiment of the present invention. This support apparatus 30 comprises a base 31 formed like a ring, and a plurality of support arms 32 extending downward in a cantilever fashion from a plurality of (e.g., 8) positions separated from each other by a predetermined gap in the circumferential direction of the base 31. The base 31 and the individual support arms 32 are integrally formed from a metal material (e.g., aluminum), whereby the support arms 32 easily flex due to elastic deformation in the diametric direction of the circle formed thereby. Each support arm 32 is formed with one adhesive injection hole 33. The adhesive injection hole 33 penetrates through the support arm 32 from the outer side face to the inner side face, whereas the inner side face of the support arm 32 is formed with a groove 34 extending along the circumferential direction of the base 31.

In thus configured support apparatus 30, the base 31 is disposed at a position shifted upward in the drawing from the outer peripheral face position of a reference plate 36, whereas each support arm 32 is bonded and secured to the outer peripheral face of the reference plate 36 by an adhesive injected from the adhesive injection hole 33 of the support arm 32. Here, the positional relationship between the support apparatus 30 and the reference plate 36 is adjusted such that the position of a neutral plane of the reference plate 36 in the thickness direction is located at the position of each adhesive injection hole 33 formed in the respective support arm 32. The groove 34 prevents the adhesive injected from the each adhesive injection hole 33 from dripping. The support apparatus 30 and the reference plate 36 are kept in a noncontact state except for the part of adhesive injection holes 33.

The reference plate 36 bonded to the support apparatus 30 with the adhesive is attached to an interferometer body, which is not depicted, by way of the base 31 formed like a ring in the support apparatus 30.

As mentioned above, the base 31 is disposed at a position shifted from the outer peripheral face of the reference plate 36, whereas each of the support arms 32 is formed like a cantilever so that they are easy to deform elastically in the diametric direction of a circle formed thereby, whereby large forces are prevented from acting on the bonded part with respect to the outer peripheral face of the reference plate 36 due to the difference in coefficient of thermal expansion the between the support apparatus 30 and the reference plate 36 when temperature changes. Therefore, external forces acting on the reference plate 36 can be prevented from increasing when temperature changes and deforming the reference plate 36, and forces caused by volumetric changes upon curing the adhesive can be restrained from acting on the reference plate 36.

Each of the support arms 32 integrally formed with the base 31 of the support apparatus 30 extends in the optical axis direction of the reference plate 36 allowing elastic deformation in the diametric direction orthogonal thereto, while being harder to deform elastically in its extending direction, i.e., in its optical axis direction, than in the orthogonal direction. Therefore, even when carrying out fringe scanning analysis in which measurement is repeated while moving the reference plate 36 in the optical axis direction at a high speed, each support arm 32 can be handled as a rigid body in its moving direction, whereby no adverse effect occurs in highly accurate measurement.

Since the support apparatus 30 is constituted by one component, it is easy to process, and can easily be attached to the reference plate 36.

As a specific form of the reference plate 36, one having a disk-shaped form with a diameter of 160 mm and a thickness of 50 mm may be used, for example.

Though embodiments of the present invention are explained in the foregoing, the present invention can be modified in various manners without being restricted thereto.

In Example 1, the support member 11 is formed with a plurality of cutouts 14 so as to make it easier for the support member 11 to deform elastically in the circumferential direction. Instead, the support member may be a wavy leaf spring, adapted to deform elastically, having a width on a par with that of the support member 11 of Example 1. This leaf spring may surround the outer periphery of the reference plate 16, whereas the leaf spring and the outer peripheral face of the reference plate 16 may be bonded to each other at a plurality of points as in Example 1, so that the leaf spring becomes rigid in the optical axis direction of the reference plate 16 while being easy to deform elastically in the circumferential and diametric directions.

The support member 11 may be formed like a polygonal ring without being restricted to the annular form in Example 1. Also, those defined as ring refer are not restricted to closed rings, but may be any support member 11 which can surround a major part of the outer peripheral face of the reference plate 16 when wrapped about the outer peripheral face of the reference plate 16 even if both ends of thus wrapping support member 11 are not in contact with each other.

The base 31 may be formed like a polygonal ring without being restricted to the annular form in Example 2.

Though the base 31 and the individual support arms 32 are integrally formed from a metal material (e.g., aluminum) in Example 2, the base 31 and individual arms 32 may be prepared separately from each other and then integrated by screwing, bonding, and the like so as to construct the support member 30. Also, materials other than metal materials can also be used, for example, such that the base 31 is formed from ceramics whereas the support arms 32 are formed from a metal.

As explained in the foregoing, the support member for a reference plate is configured so as to make it easier to deform elastically in the circumferential/diametrical direction of the reference plate supported thereby but less in the optical axis direction of the reference plate than in the circumferential/diametrical direction thereof, whereby the support apparatus for an optical wave interferometer reference plate in accordance with the present invention has the following advantageous effects.

Even when the support member expands/contracts, large forces can be prevented from being transmitted to the outer peripheral face of the reference plate. As a consequence, the deformation occurring in the reference plate due to external forces acting on the reference plate when temperature changes can fall within a range not affecting the measurement, and forces can be restrained from acting on the reference plate due to volumetric changes upon curing the adhesive.

Also, even when carrying out fringe scanning analysis in which measurement is repeated while moving the reference plate in the optical axis direction at a high speed, the support member is rigid in its moving direction, whereby minute vibrations are restrained from occurring at the time when starting or stopping the movement, whereby favorable measurement can be carried out.

Further, since the support member can be constituted by one component, it is easy to process and can easily be attached to the reference plate.

What is claimed is:

1. In an optical wave interferometer for splitting a luminous flux from a light source into two, irradiating a sample with one of thus obtained two luminous fluxes so as to attain object light carrying a phase state of said sample, irradiating a reference plate with the other so as to attain reference light carrying a phase state of said reference plate, and re-combining said object light and reference light together so as to attain an interference fringe corresponding to a phase difference therebetween;

a support apparatus for an optical wave interferometer reference plate comprising a support member for supporting an outer peripheral face of said reference plate, said support member being a structure bonded to said outer peripheral face of said reference plate at a plurality of positions spaced from each other along a circumferential direction of said outer peripheral face and adapted to deform elastically in a circumferential/diametric direction of said reference plate but less in an optical axis direction of said reference plate than in said circumferential/diametric direction.

2. A support apparatus for an optical wave interferometer reference plate according to claim 1, wherein said support member has an annular form surrounding said outer peripheral face of said reference plate, said support member comprising cutouts extending from one of first and second ends in said optical axis direction of said reference plate toward the other to a position near said other end, and wherein cutouts extending from said first end toward said second end and cutouts extending from said second end toward said first end are disposed substantially alternately with respect to each other along said circumferential direction of said support member.

3. A support apparatus for an optical wave interferometer reference plate according to claim 2, wherein said support member is formed with adhesive injection holes penetrating through said support member from said outer peripheral face to said inner peripheral face with a predetermined interval along said circumferential direction of said support member, and wherein a groove extending in said circumferential direction is formed at respective positions where said adhesive injection holes are formed.

4. A support apparatus for an optical wave interferometer reference plate according to claim 1, wherein said support member has an annular base disposed at a position separated from said outer peripheral face of said reference plate in said optical axis direction of said reference plate, a plurality of support arms extending from said base in said optical axis direction of said reference plate in a cantilever fashion at a plurality of positions spaced from each other by a predetermined interval along said circumferential direction of said base, and a bonding part formed in each of said support arms so as to be bonded to said outer peripheral face.

5. A support apparatus for an optical wave interferometer reference plate according to claim 4, wherein said bonding part is constituted by an adhesive injection hole penetrating through said support arms from an outer side face to an inner side face thereof, and wherein a groove extending in said circumferential direction of said base is formed at a position where said adhesive injection hole is formed in said inner side face.

* * * * *